(12) United States Patent
Zheng et al.

(10) Patent No.: US 12,216,199 B2
(45) Date of Patent: Feb. 4, 2025

(54) DE-ALIASED IMAGING FOR A SYNTHETIC APERTURE RADAR

(71) Applicant: Aptiv Technologies AG, Schaffhausen (CH)

(72) Inventors: Le Zheng, Los Angeles, CA (US); Yu Zhang, Thousand Oaks, CA (US); Edgar Ortiz, Newbury Park, CA (US); Clinton Colby, Santa Rosa Valley, CA (US)

(73) Assignee: Aptiv Technologies AG, Schaffhausen (CH)

( * ) Notice: Subject to any disclaimer, the term of this patent is extended or adjusted under 35 U.S.C. 154(b) by 427 days.

(21) Appl. No.: 17/503,212

(22) Filed: Oct. 15, 2021

(65) Prior Publication Data
US 2023/0018183 A1     Jan. 19, 2023

Related U.S. Application Data

(60) Provisional application No. 63/221,997, filed on Jul. 15, 2021.

(51) Int. Cl.
*G01S 13/90* (2006.01)
*B60W 50/06* (2006.01)
(Continued)

(52) U.S. Cl.
CPC ......... *G01S 13/9027* (2019.05); *B60W 50/06* (2013.01); *G06T 5/20* (2013.01);
(Continued)

(58) Field of Classification Search
CPC ......... G01S 13/9027; G06T 5/70; G06T 5/20; G06T 2207/10044; G06T 2207/30252;
(Continued)

(56) References Cited

U.S. PATENT DOCUMENTS

| 4,853,699 A | 8/1989 | Easton |
| 6,628,844 B1 * | 9/2003 | Benitz ................. G01S 13/9011 382/280 |

(Continued)

FOREIGN PATENT DOCUMENTS

CN     111670381 A  *  9/2020  ............. G01S 13/60

OTHER PUBLICATIONS

Backprojection_for_Synthetic_Aperture_Radar.pdf, Backprojection for Synthetic Aperture Radar, Michael Israel Duersch, BYU ScholarsArchive (Year: 2013).*

(Continued)

*Primary Examiner* — Timothy A Brainard
*Assistant Examiner* — Kenneth W Good
(74) *Attorney, Agent, or Firm* — Harness, Dickey & Pierce, P.L.C.

(57) ABSTRACT

This document describes techniques for enabling de-aliased imaging for a synthetic aperture radar. Radar signals processed by a synthetic aperture radar (SAR) system may include false detections in the form of aliasing induced by grating lobes. The techniques described herein can reduce the adverse effects of grating lobes by obtaining an initial SAR image using a back-projection algorithm. Aliasing effects (e.g., false detections) in this initial image may be common due to the limitations of an SAR system moving at non-uniform speeds. A refined image is produced from the initial image by applying a de-aliasing filter to the initial image. The refined image may have reduced or eliminated false detections that attribute to aliasing effects, resulting in a better representation of the environment of the vehicle.

17 Claims, 7 Drawing Sheets

(51) Int. Cl.
*B60W 60/00* (2020.01)
*G06T 5/20* (2006.01)
*G06T 5/70* (2024.01)

(52) U.S. Cl.
CPC ............ *G06T 5/70* (2024.01); *B60W 60/0015* (2020.02); *B60W 2420/408* (2024.01); *G06T 2207/10044* (2013.01); *G06T 2207/30252* (2013.01)

(58) Field of Classification Search
CPC ............. B60W 50/06; B60W 60/0015; B60W 2420/408
See application file for complete search history.

(56) References Cited

U.S. PATENT DOCUMENTS

| | | | |
|---|---|---|---|
| 7,474,262 B2 | 1/2009 | Alland | |
| 7,639,171 B2 | 12/2009 | Alland et al. | |
| 9,250,323 B2* | 2/2016 | Ranney | G01S 13/9089 |
| 9,310,468 B2 | 4/2016 | Arage | |
| 11,885,907 B2* | 1/2024 | Popov | G06T 7/73 |
| 2011/0142366 A1* | 6/2011 | Young | G06T 3/4069 |
| | | | 382/274 |
| 2015/0061926 A1* | 3/2015 | Ranney | G01S 7/414 |
| | | | 342/25 B |
| 2015/0285891 A1* | 10/2015 | Dannels | G01R 33/56554 |
| | | | 324/309 |
| 2016/0377711 A1 | 12/2016 | Arage | |
| 2018/0074185 A1* | 3/2018 | Capraro | G01S 13/5244 |
| 2019/0242711 A1* | 8/2019 | Ingersoll | G01C 21/1652 |
| 2020/0158861 A1* | 5/2020 | Cattle | G01S 13/345 |
| 2020/0249315 A1* | 8/2020 | Eshet | G01S 13/343 |
| 2020/0320731 A1* | 10/2020 | Sheen | G01S 13/90 |
| 2022/0120851 A1* | 4/2022 | Prager | G01S 7/03 |
| 2023/0408452 A1* | 12/2023 | Van Neer | G01N 29/043 |

OTHER PUBLICATIONS

17503212_2024-01-17_CN_111670381_A_M.pdf, machine translation of CN-111670381-A (Year: 2020).*
"Extended European Search Report", EP Application No. 22173503.8, Oct. 17, 2022, 15 pages.
Gao, et al., "MIMO-SAR: A Hierarchical High-resolution Imaging Algorithm for mmWave FMCW Radar in Autonomous Driving", Jun. 4, 2021, 13 pages.
Zhang, et al., "Unambiguous Forward-Looking SAR Imaging on HSV-R Using Frequency Diverse Array", Sensors, vol. 20, No. 4, Feb. 20, 2020, 15 pages.
Farhadi, et al., "Automotive Synthetic Aperture Radar Imaging using TDM-MIMO", May 2021,.
Iqbal, et al., "Realistic SAR Implementation for Automotive Applications", Dec. 2020, 4 pages.
Laribi, et al., "Performance Investigation of Automotive SAR Imaging", Apr. 2018, 4 pages.
Smith, "Near-field MIMO-ISAR millimeter-wave imaging", Mar. 2019, 6 pages.
Waldschmidt, et al., "Automotive Radar—From First Efforts to Future Systems", Jan. 2021, 14 pages.
Yanik, et al., "3-D MIMO-SAR imaging using multi-chip cascaded millimeter-wave sensors", Nov. 2019, 5 pages.
Yanik, et al., "Development and Demonstration of MIMO-SAR mmWave Imaging Testbeds", Jul. 2020, 20 pages.

* cited by examiner

DE-ALIASED IMAGING FOR A SYNTHETIC APERTURE RADAR

CROSS-REFERENCE TO RELATED APPLICATION

This application claims the benefit under 35 U.S.C. 119(e) of U.S. Provisional Application No. 63/221,997, filed Jul. 15, 2021, the disclosure of which is hereby incorporated by reference in its entirety herein.

BACKGROUND

Many radar systems used in automotive applications output point clouds of detected objects. These point clouds provide position information of the objects, but detailed shape and structural information related to the targets may be unavailable in the radar output. Synthetic aperture radar (SAR) techniques are being tested to increase the angular resolution of vehicle-based radar systems. However, existing SAR techniques are susceptible to aliasing. That is, due to grating lobes present in a SAR with non-uniform motion, one target may be represented as multiple targets in a radar image. Errors in a radar image such as this can cause unsafe vehicle control and decrease driving safety.

SUMMARY

This document describes techniques, apparatuses, and systems for de-aliased imaging for a synthetic aperture radar. Radar signals received and processed by a synthetic aperture radar (SAR) system may include false detections in the form of aliasing induced by grating lobes. Increasing angular resolution while eliminating the adverse effects of grating lobes in a radar system utilizing SAR techniques is highly desirable for automotive applications. The techniques, apparatuses, and systems described herein reduce the adverse effects of grating lobes by obtaining an initial SAR image using a back-projection algorithm. Aliasing effects (e.g., false detections) in this initial image may be common due to the limitations of an SAR system moving at non-uniform speeds. A refined image is produced from the initial image by applying a de-aliasing filter to the initial image. The refined image may have reduced or eliminated aliasing effects resulting in a better representation of the environment of the vehicle.

In one example, a method of de-aliased imaging for a synthetic aperture radar includes deriving an initial image from a back-projection algorithm applied to signals received by one or more receive channels of a radar system. The method also includes applying a de-aliasing filter on the initial image derived from the back-projection algorithm to reduce aliasing effects of grating lobes present in the initial image derived from the back-projection algorithm. The method further includes outputting the refined image, produced by the de-aliasing filter applied to the initial image derived from the back-projection algorithm, to a processor for controlling a vehicle.

In another example, a radar system includes at least one processor configured to perform this and other methods. This document also describes a computer-readable storage medium comprising instructions that, when executed, configure at least one processor to perform the above-summarized method and the other methods set forth herein, in addition to describing systems configured to perform the above-summarized method and the other methods set forth herein.

This Summary introduces simplified concepts related to de-aliased imaging for a synthetic aperture radar, further described in the Detailed Description and Drawings. This Summary is not intended to identify essential features of the claimed subject matter, nor is it intended for use in determining the scope of the claimed subject matter. That is, one problem solved by the described techniques is reducing aliasing effects due to grating lobes from an SAR image generated by a radar system included on a vehicle. Other techniques may require uniform velocity of the vehicle or over-sampling that can quickly overload the processing resources. None of these other techniques may be practical for driving applications. Therefore, although primarily described in the context of improving radar signal processing of an automotive vehicle, de-aliased imaging for a synthetic aperture radar can be applied to other real-time applications where reducing the adverse effects of grating lobes in radar imaging is desired.

BRIEF DESCRIPTION OF THE DRAWINGS

The details of one or more aspects of for de-aliased imaging for a synthetic aperture radar are described in this document with reference to the Drawings, which use same numbers to reference like features and components, including hyphenated numbers to designate variations of the like features and components, and which are organized as follows:

FIGS. 5-1 and 5-2 illustrate an initial SAR image and a refined SAR image, respectively, produced by de-aliased imaging for a synthetic aperture radar, in accordance with techniques of this disclosure.

DETAILED DESCRIPTION

Overview

SAR systems are capable of creating large synthetic arrays of channels with a limited number of physical channels. Larger synthetic arrays result in a larger aperture size and better angular resolution. Therefore, SAR systems can be ideal for vehicle applications where high angular resolution is desired, but physical space is limited. However, SAR systems, used in automotive applications, do have some drawbacks.

Generally, SAR systems are mounted on moving platforms. They have been used successfully on aircraft and satellites for many years. The SAR forms a large aperture by receiving transmitted signals as the host platform moves a distance over time. This motion is often uniform (e.g., constant velocity) as is the case in aircraft and spacecraft use. If the motion is non-uniform (e.g., changing velocities of vehicles driving on roads) grating lobes may develop. These grating lobes may cause false detections due to aliasing effects. Some existing techniques to adapt SAR systems to automotive applications are limited by this uniform velocity requirement, as automobiles often travel with a non-uniform velocity (e.g., in urban environments, in heavy traffic conditions).

Other existing techniques attempt to solve the non-uniform velocity issue by over-sampling the received signals. These techniques succeed in handling non-uniform velocity; however, as the velocity increases, the processing load due to the over-sampling significantly increases. The higher processing loads may prohibit over-sampling techniques as a viable option for automotive applications, which often involve driving at high speeds (e.g., on a highway).

In contrast to the techniques described above, de-aliased imaging for a synthetic aperture radar, as described herein, is a more effective and efficient technique to adapt SAR systems to automotive applications. The techniques described herein overcome disadvantages of other techniques by applying a de-aliasing filter to an initial SAR image. Aliasing due to grating lobes can be reduced in driving scenarios where non-uniform velocities are common. Eliminating grating lobes, and therefore applying de-aliasing filters in this way, is not necessary for previous applications of SAR (e.g., aviation, space) where velocities are able to be maintained constant for long periods of time. Additionally, the de-aliasing filter enables the SAR system to under-sample the received signals and maintain a desired angular resolution, and thus, may lower computational loads on the SAR system.

Example Environment

Figure 1:
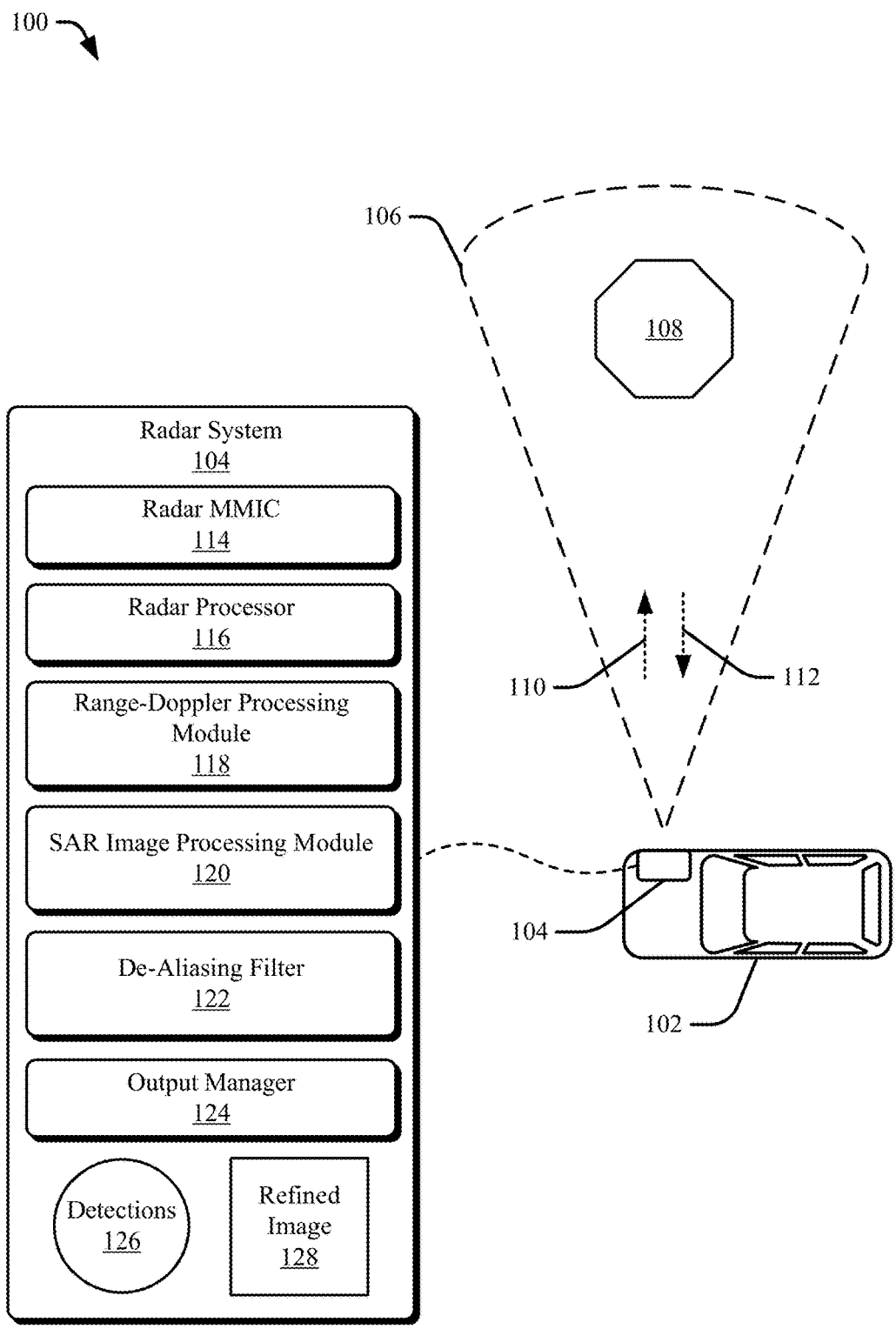
FIG. 1 illustrates an example environment in which de-aliased imaging for a synthetic aperture radar can be applied, in accordance with techniques of this disclosure.

FIG. 1 illustrates an example environment 100 in which de-aliased imaging for a synthetic aperture radar can be applied, in accordance with techniques of this disclosure. In the depicted environment 100, a vehicle 102 travels on a roadway by at least partially relying on output from a SAR system 104. Although illustrated as a passenger car, the vehicle 102 can represent other types of motorized vehicles (e.g., truck, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The SAR system 104 can be installed on, mounted to, or integrated with any moving platform, including moving machinery or robotic equipment. Components of the SAR system 104 can be arranged in a front, back, top, bottom, or side portion of the vehicle 102, within a bumper, integrated into a side mirror, formed as part of a headlight and/or tail light, or at any other interior or exterior location where objects require detection. The vehicle 102 may include multiple SAR system 104, such as a first SAR system and a second SAR system, to provide a custom field-of-view 106 that encompasses a particular region of interest outside the vehicle 102. Acting as part of a perception system of the vehicle 102, the SAR system 104 aids in driving the vehicle 102 by enabling advanced safety or autonomous driving features. Vehicle subsystems may rely on the SAR system 104 to detect whether any objects (e.g., an object 108) appear in the environment 100 within a particular field of view (FOV) 106.

The SAR system 104 is configured to detect the object 108 by radiating the object 108 within the field of view 106. For example, the object 108 can be a stationary or moving object and includes one or more materials that reflect radar signals. The object 108 may be another vehicle, a traffic sign, a barrier, an animal, a pedestrian, or any other object or debris.

Radar tracking of the object 108 can occur by transmitting radar signals 110 and receiving a reflected version as radar signals 112, to detect whether the object 108 is in proximity of the vehicle 102. The SAR system 104 emits electromagnetic (EM) radiation when transmitting the signals 110 via antenna elements with a direction of departure (DOD). The SAR system 104 expects to receive the signals 112 with a direction of arrival (DOA) that matches the DOD of the signals 110. Tracking the object 108 over time as a target of interest may enable the vehicle 102 to safely navigate in the environment while avoiding the object 108.

The SAR system 104 can generate a large aperture by utilizing virtual (e.g., synthetic) receive channels to increase angular resolution and produce a radar image of the FOV 106. These virtual receive channels may be produced by the motion of the SAR system 104. The SAR system 104 may also include a single transmit channel or multiple transmit channels (e.g., multiple-input multiple-output (MIMO) radar system). Generally, the motion of a SAR system is assumed to be constant in relation to targets. Otherwise, adverse effects of grating lobes induced by non-uniform velocities can interpret the signals 112 to include false detections, also referred to as aliases, that are included in the radar image. However, applying the techniques described herein, the SAR system 104 may have a non-uniform velocity in relation to objects (e.g., the object 108) and operate accurately by reducing the adverse effects of the grating lobes.

The SAR system 104 can include a combination of hardware components and software components executing thereon. For example, a computer-readable storage media (CRM) of the SAR system 104 may store machine-executable instructions that, when executed by a processor of the SAR system 104, cause the SAR system 104 to output information about objects detected in the field of view 106. As one example, the SAR system 104 includes a signal processing component that may include a radar monolithic microwave integrated circuit (MMIC) 114 and a radar processor 116. The radar MMIC 114 and the radar processor 116 may be physically separated components, or their functionality may be included within a single integrated circuit. Other processors may, likewise, be present in some aspects. In this example, the SAR system 104 also includes a range-Doppler processing module 118, an SAR image processing module 120, a de-aliasing filter 122, and an output manager 124. In other examples, the operations associated with the SAR system 104 can be performed using a different arrangement or quantity of components than that shown in FIG. 1. These components receive radar signals 112 to generate detections 126 and a refined SAR image 128 (e.g., a radar image with reduce adverse effects of grating lobes). The detections 126 and the refined SAR image 128 can be used to update object tracks and classify objects.

The signals 112 can be amplified, down-converted, and sampled by the radar MMIC 114. The radar processor 116 executes instructions to perform the functions of the range-Doppler processing module 118, the SAR image processing module 120, and the de-aliasing filter 122. The range-Doppler processing module 118 receives the signals 112 from each receive channel of the SAR system 104 and extracts range-Doppler detections 126 for each of the receive channels. The SAR image processing module 120 applies a back-projection algorithm over multiple frames of the range-Doppler detections to create an initial SAR image for each receive channel. Due to the vehicle 102 traveling at non-uniform velocities, grating lobes may form causing ambiguities in the initial SAR images. These ambiguities can manifest as multiple detections of the object 108 in different locations than the true location of the object 108. For example, in the initial SAR images, the object 108 is detected at its true location (e.g., directly ahead of the vehicle 102), but because of grating lobes, the object 108 may be falsely detected as being at locations to the left or right of the true location of the object 108.

To remove the false detections of the object 108, a de-aliasing filter 122 is applied to the initial SAR images. The de-aliasing filter 122 uses a steering vector for each array element to refine the initial SAR images. The refined SAR image 128 can be output to other systems in the vehicle 102 via the output manager 124 to assist with various driving applications.

Example Vehicle Configuration

Figure 2:
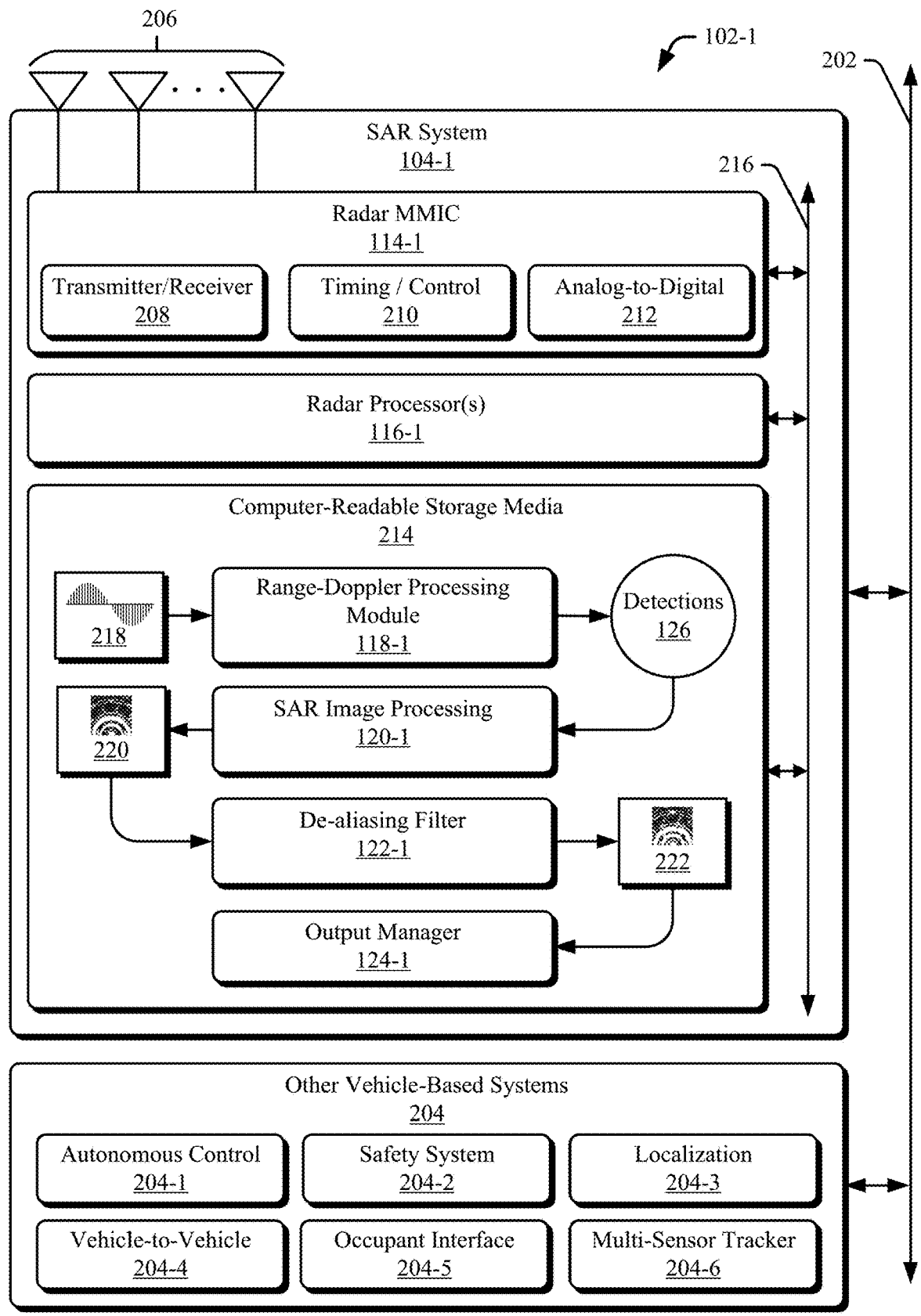
FIG. 2 illustrates an example configuration of a portion of a vehicle with an SAR system configured to perform de-aliased imaging for a synthetic aperture radar, in accordance with techniques of this disclosure.

FIG. 2 illustrates an example configuration of a portion of a vehicle 102-1 with an SAR system 104-1 configured to perform de-aliased imaging for a synthetic aperture radar, in accordance with techniques of this disclosure. A vehicle 102-1 is an example of the vehicle 102. Included in the vehicle 102-1 is the SAR system 104-1, which is an example of the SAR system 104. The vehicle 102-1 further includes a communication link 202 that the SAR system 104-1 can use to communicate to other vehicle-based systems 204. The communication link 202 may be a wired or wireless link and, in some cases, includes a communication bus (e.g., CAN bus). The other vehicle-based systems 204 perform operations based on information received from the SAR system 104-1, over the link 202, such as data output from the SAR system 104-1, including information indicative of one or more objects identified and tracked in the FOV.

The SAR system 104-1 includes a radar MMIC 114-1 and a radar processor 116-1, similar to the SAR system 104. The SAR system 104-1 further includes multiple antenna elements 206. The antenna elements 206 transmit and receive signals (e.g., the signals 110 and 112) based on instructions executed by the radar MMIC 114-1. This disclosure primarily concerns received signals and, thus, will not detail the transmit characteristics of the SAR system 104-1. The radar MMIC 114-1 includes one or more transceivers/receivers 208, timing/control circuitry 210 and analog-to-digital converters (ADC) 212.

The SAR system 104-1 further includes a computer-readable storage media (CRM) 214 (e.g., a memory, long-term storage, short-term storage), which stores instructions for the SAR system 104-1. The CRM 214 stores a range-Doppler processing module 118-1, an SAR image processing module 120-1, a de-aliasing filter 122-1, and an output manager 124-1. Other instructions, relevant to the operation of the SAR system 104-1 may, likewise, be stored in the CRM 214. The components of the SAR system 104-1 communicate via a link 216. For example, the radar processor 116-1 receives samples 218 of the received signals from the radar MMIC 114-1 over the link 216. The radar processor 116-1 also receives instructions from the CRM 214 to execute the range-Doppler processing module 118-1, the SAR image processing module 120-1, the de-aliasing filter 122-1, and the output manager 124-1 over the link 216.

The range-Doppler processing module 118 determines radar detections 126 from the samples 218 by performing range-Doppler fast Fourier transforms (FFTs) on the samples 218. The SAR image processing module 120-1 applies a back-projection algorithm to the detections 126 over multiple frames and produces an initial SAR image 220 for each receive channel based on the back-projection algorithm. The de-aliasing filter 122-1 further refines the initial SAR images 220 by reducing or removing aliasing effects caused by grating lobes present in the SAR system 104-1 as it travels at non-uniform speeds and produces a refined SAR image 222. The de-aliasing filter 122-1 also enables the radar MMIC 114-1 to under-sample the radar signals. The refined SAR image 222 is made available by the output manager 124-1 to the other vehicle-based systems 204.

The other vehicle-based systems 204 can include autonomous control system 204-1, safety system 204-2, localization system 204-3, vehicle-to-vehicle system 204-4, occupant interface system 204-5, multi-sensor tracker 204-6, and other systems not illustrated. Objects in the FOV can be inferred and classified based on the refined SAR image 222 output to the other vehicle-based systems 204. In this manner, the other vehicle-based systems 204 can receive an indication of one or more objects detected by the SAR system 104-1 in response to the SAR system 104-1 combining and analyzing radar data generated by the received signals. The other vehicle-based systems 204 may perform a driving function or other operation that may include using output from the SAR system 104-1 to assist in determining driving decisions. For example, the autonomous control system 204-1 can provide automatic cruise control and monitor the SAR system 104-1 for output that indicates the presence of objects in the FOV, for instance, to slow the speed and prevent a collision with an object in the path of the vehicle 102-1. The safety system 204-2 or the occupant interface system 204-5 may provide alerts or perform a specific maneuver when the data obtained from the SAR system 104-1 indicates that one or more objects are crossing in front of the vehicle 102-1.

Example Architecture

Figure 3:
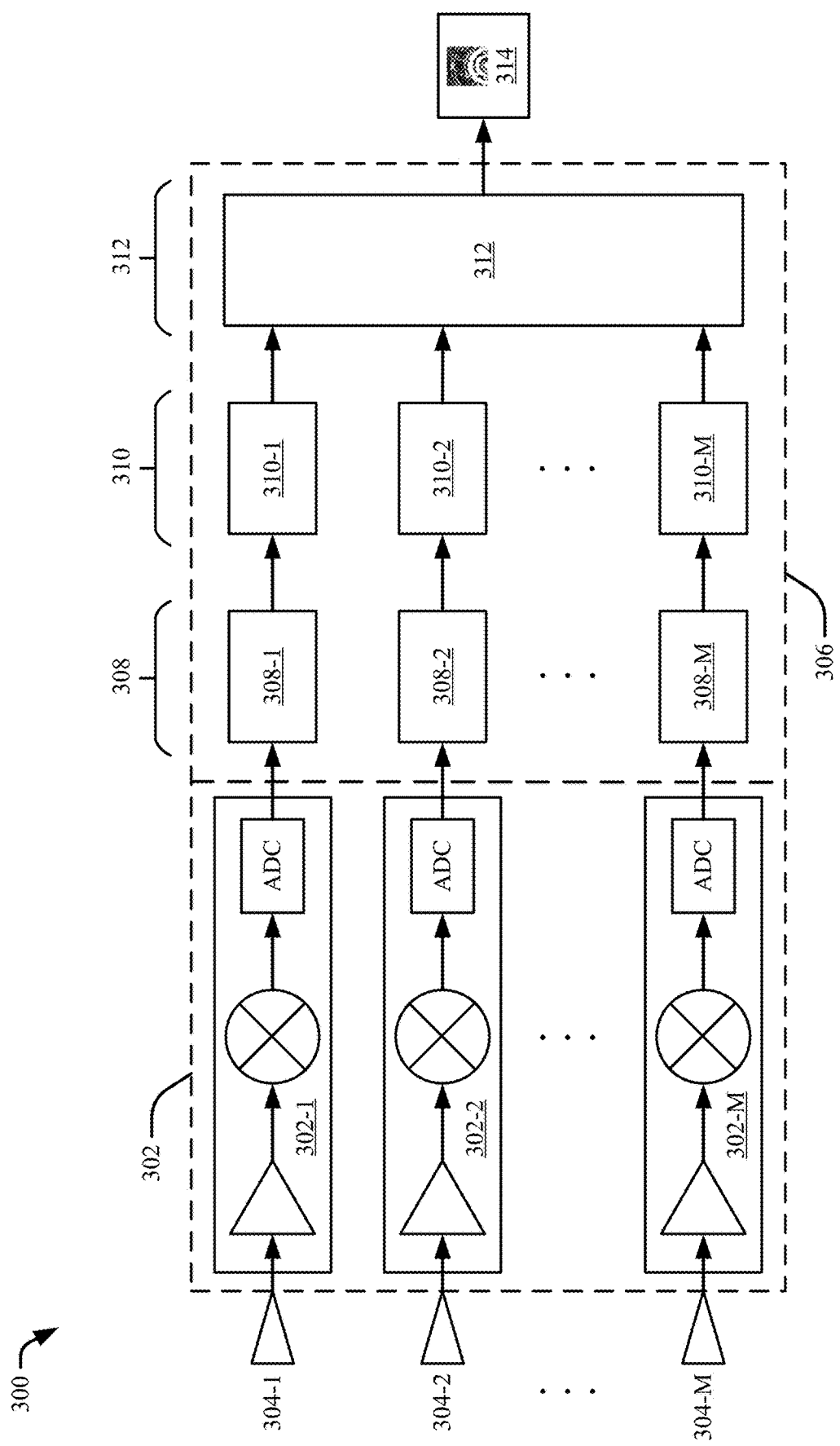
FIG. 3 illustrates an example SAR system configured to perform de-aliased imaging for a synthetic aperture radar, in accordance with techniques of this disclosure.

FIG. 3 illustrates an example SAR system 300 configured to perform de-aliased imaging for a synthetic aperture radar, in accordance with techniques of this disclosure. A radar MMIC 302, similar to radar MMIC 114, includes receive channels 302-1 to 302-M. Each of the receive channels 302-1 to 302-M receives signals from antenna elements 304-1 to 304-M. Due to the ability of SAR techniques to leverage a limited quantity of physical channels to a greater quantity of virtual channels, the quantity of physical antenna elements may differ from the quantity of virtual receive channels.

Within the radar MMIC 302, each of the receive channels 302-1 to 302-M performs preprocessing on the received signals that may include amplification, down-conversion, analog-to-digital conversion, or other preprocessing functions. The receive channels 302-1 to 302-M output sampled signals to be further processed by a radar processor 306. Executed by the radar processor 306, a range-Doppler processing module 308, including a range-Doppler processing submodule (e.g., range-Doppler processing submodules 308-1 to 308-M) converts the sampled signals into detections by performing range-Doppler FFTs on the signals received by each of the receive channels 302-1 to 302-M. Multiple frames of these detections for each receive channel 302-1 to 302-M are input into an SAR image processing module 310, including SAR image processing submodules 310-1 to 310-M corresponding to the receive channels 302-1 to 302-M. A back-projection algorithm is applied to N frames on a pixel basis, $I_m(x, y)$, for M radar channels (302-1 to 302-M) based on equation 1:

$$I_m(x, y) = \sum_{i=1}^{N} e^{\left(\frac{-j4\pi \tau_i(x,y)}{\lambda}\right)} s_{m,i} \quad \text{Equation 1}$$

where $s_{m,i}$ is the signal in a range-Doppler cell for the m-th channel and $\lambda$ is the wavelength of the radar waveform. $\tau_i(x, y)$ denotes the distance between the radar and pixel (x, y) in the i-th frame such that, per equation 2:

$$\tau_i(x, y) = \sqrt{(x-x_i)^2 + (y-y_i)^2} \quad \text{Equation 2}$$

where $x_i$ and $y_i$ are the latitudinal and longitudinal position, respectively, of the radar center in the i-th frame.

The multi-framed back projections derived in the SAR image processing module 310 represent an initial SAR image for each receive channel. However, as previously mentioned, aliasing may exist in the initial image due to the non-uniform motion of a vehicle hosting the SAR system 300. The initial SAR image for each of the channels and over multiple frames is input into a de-aliasing filter 312. For each pixel from the multiple channels is filtered by a digital beamformer of the pixel direction. The de-aliasing filter is implemented on each pixel (x, y) according to equation 3 to produce refined SAR image I(x, y):

$$I(x, y) = \sum_{m=1}^{M} a_m^*(x, y) I_m(x, y) \quad \text{Equation 3}$$

where $a_m^*$ is the conjugate of the m-th element of the array steering vector $a_m(x, y)$ calculated according to equation 4:

$$a_m(x, y) = e^{\frac{-j2\pi d_m \sin\theta(x,y)}{\lambda}} \quad \text{Equation 4}$$

Here $d_m$ is the horizontal difference between the m-th array element and radar center, and $\theta(x, y)$ is the azimuth of the pixel (x, y). After the de-aliasing filter 312 is applied over all the receive channels 302-1 to 302-M, the pixels are combined to produce the refined SAR image 314. Using the array steering vector for each pixel of each receive channel enables the raw radar signals to be under-sampled. The refined SAR image may have high angular resolution enabling the SAR system 300 or other vehicle-based systems to differentiate between objects that are in close proximity of each other. False detections can be reduced or eliminated based on the application of the de-aliasing filter. Thus, a SAR system configured for de-aliased imaging in this manner can result in highly accurate detection and tracking of multiple objects.

Example Scenario

Figure 4:
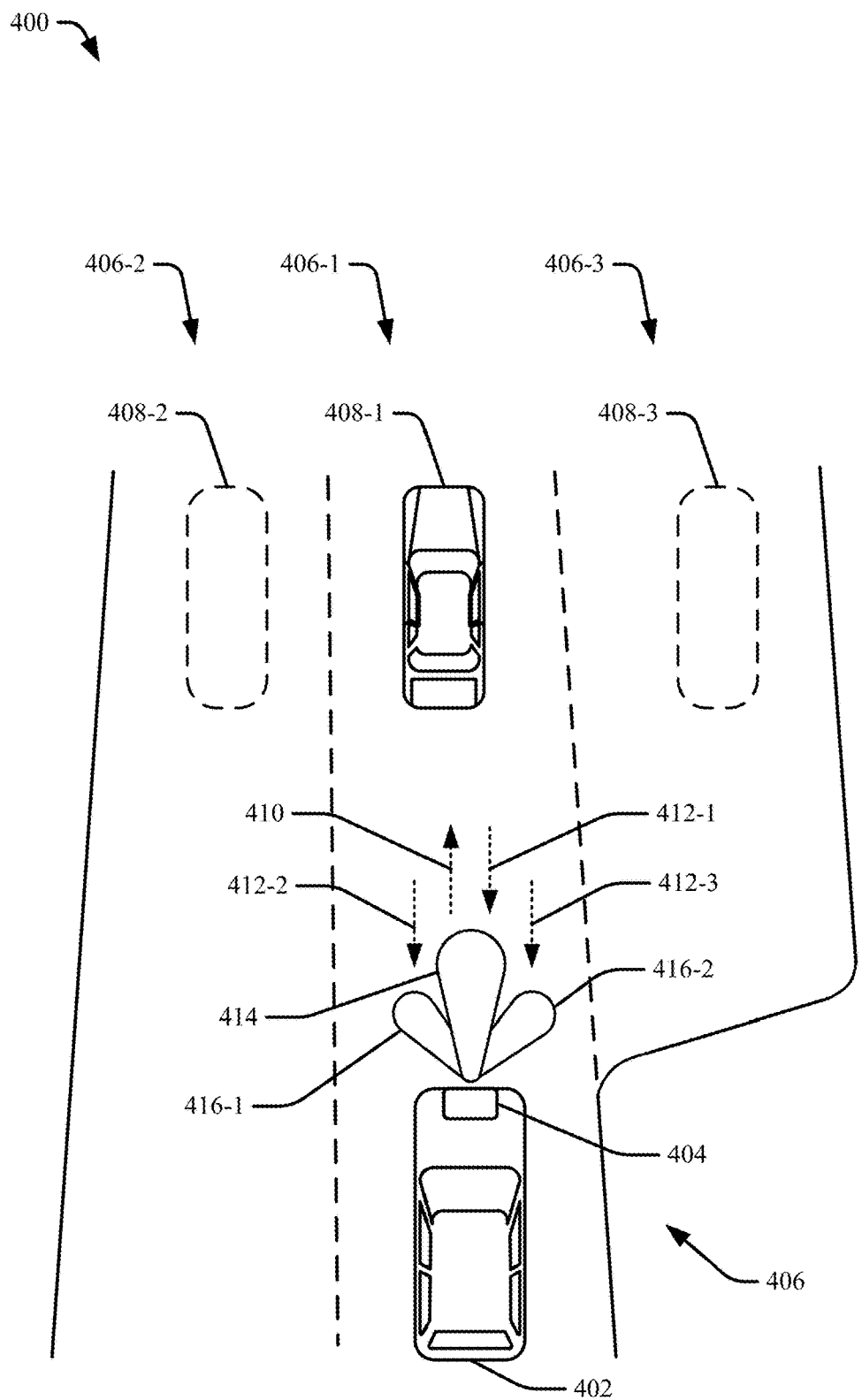
FIG. 4 illustrates an example scenario of a vehicle with a radar system configured for de-aliased imaging for a synthetic aperture radar, in accordance with techniques of this disclosure.

FIG. 4 illustrates an example scenario 400 of a vehicle 402 with a SAR system 404 configured for de-aliased imaging for a synthetic aperture radar, in accordance with techniques of this disclosure. The vehicle 402 is traveling down a road 406 with two lanes 406-1 and 406-2 and a turning lane 406-3 at non-uniform speeds in relation to a target 408-1. The SAR system 404 transmits signals 410 that reflect off of the target 408-1 and are received by the SAR system 404 as signals 412.

As the vehicle 402 begins to steer into either lane 406-2 or 406-3, a lateral non-uniform motion can be realized between the vehicle 402 and the target 408-1. The signals 412-1 are received by a main lobe 414 of the SAR system 404. The SAR system 404, likewise, receives signals 412-2 and 412-3 by grating lobes 416-1 and 416-2, respectively, due to the lateral non-uniform motion.

After the SAR system 404 preprocesses the signals 412 with a radar MMIC, the SAR system 404 performs range-Doppler FFTs and applies the back-projection algorithm to the signals 412. At this stage, the initial SAR image includes the accurate range and azimuth of the target 408-1 based on the signals 412-1 received by the main lobe 414. However, because the SAR system 404 received the radar signals 412-2 and 412-3 by the grating lobes 416-1 and 416-2, the false detections of the target 408-1, represented as targets 408-2 and 408-3 are, likewise, included in the initial SAR image. Without the additional step of applying the de-aliasing filter, the other vehicle-based systems of the vehicle 402 may interpret that targets 408-2 and 408-3 are real and make driving decisions that are based on the false targets 408-2 and 408-3. For example, an autonomous control system of the vehicle 402 may prevent the vehicle 402 from proceeding to either lane 406-2 or 406-3 based on the interpretation by the SAR system 404 that targets 408-2 and 408-3 exist.

After the de-aliasing filter is applied to the initial SAR image by the SAR system 404, the refined SAR image is produced that accurately represents the environment of the vehicle 402 with high angular resolution. The other vehicle-based systems of the vehicle 402 are able to make safe and efficient decisions based on the accurate representation of the environment in which the vehicle 402 travels.

Figures 1, 5:
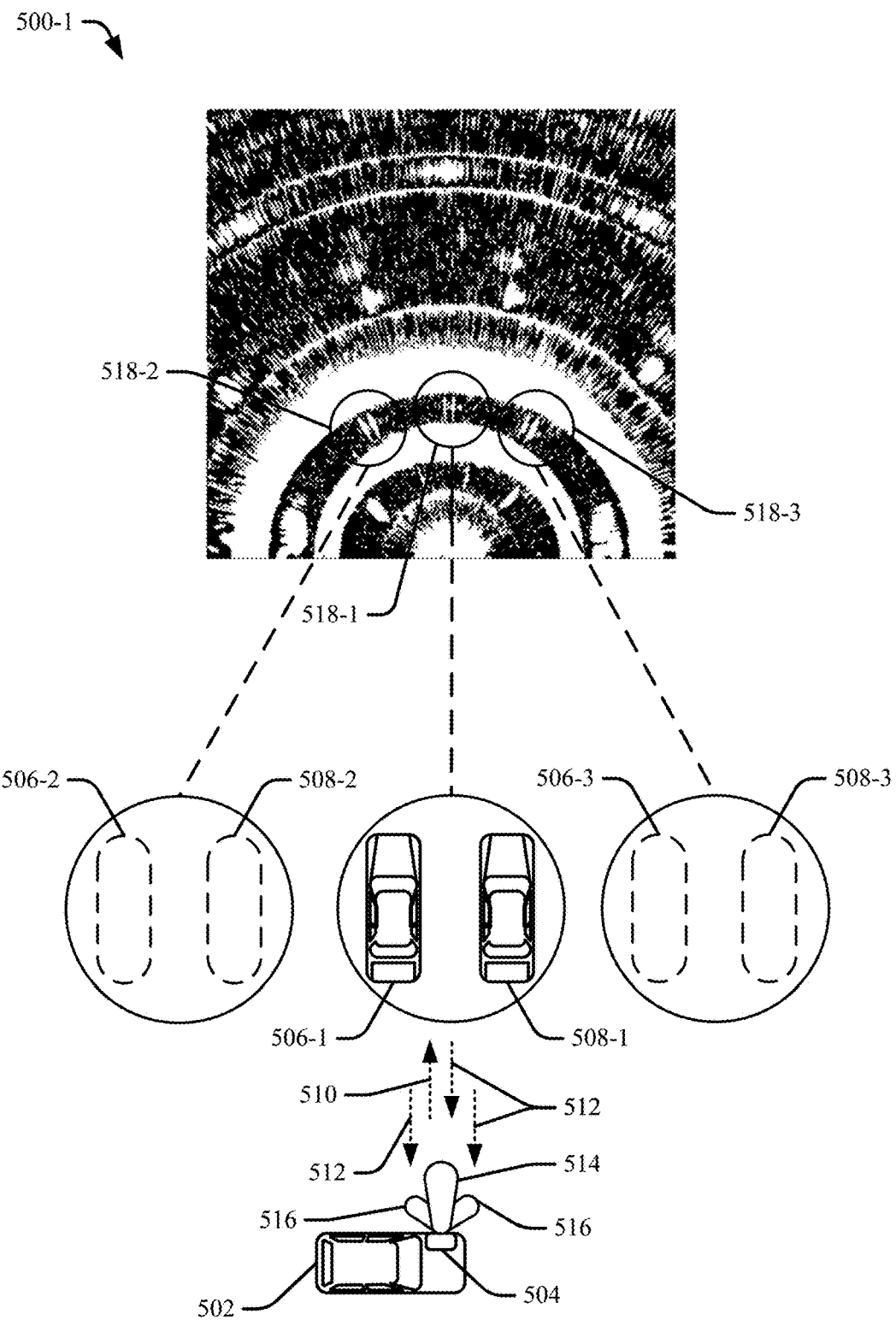
Figures 2, 5:
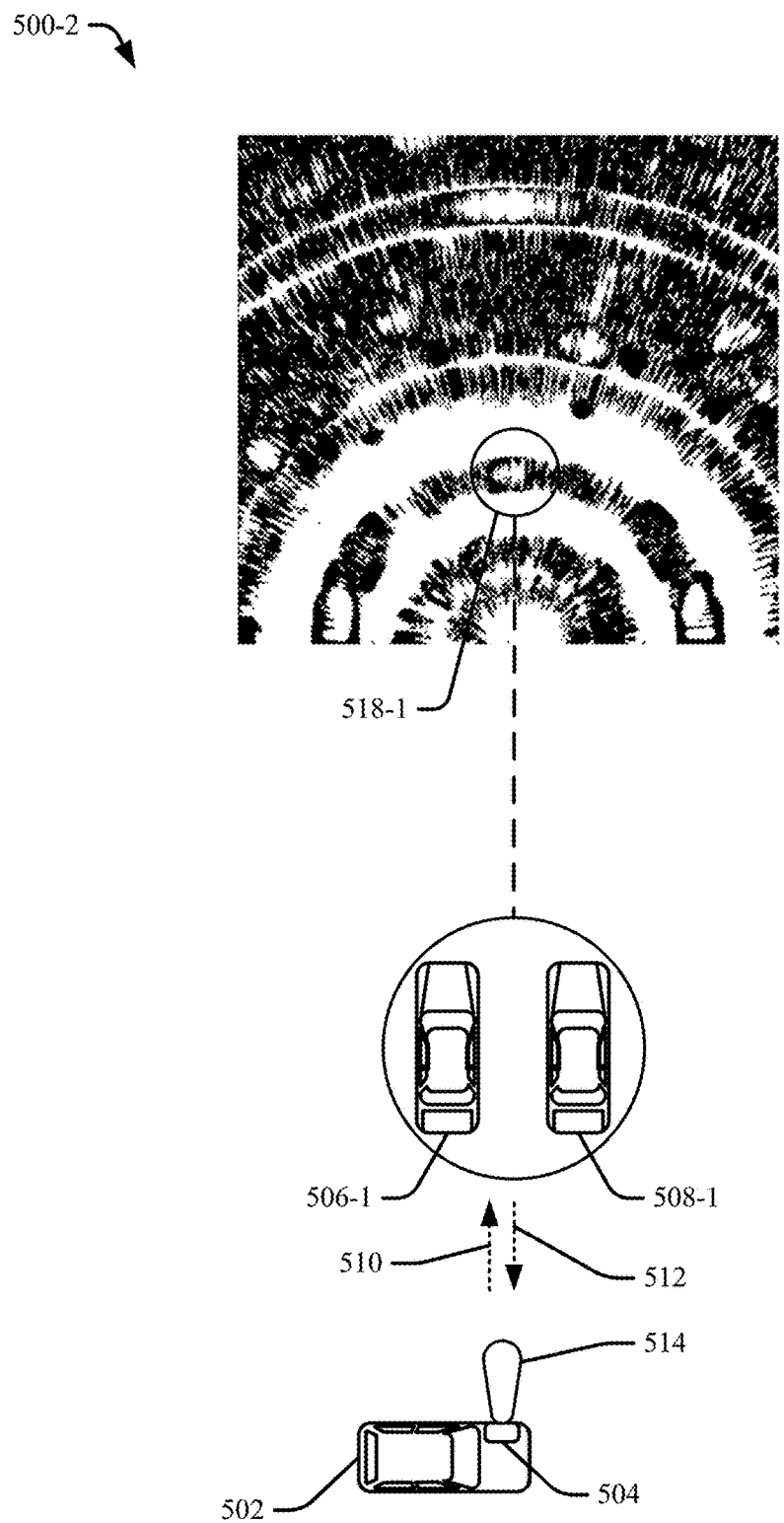

FIGS. 5-1 and 5-2 illustrate an initial SAR image 500-1 and a refined SAR image 500-2, respectively, produced by de-aliased imaging for a synthetic aperture radar, in accordance with techniques of this disclosure. A vehicle 502 includes a SAR system 504 that is configured for de-aliased imaging for a synthetic aperture radar and with a side FOV relative to the vehicle 502. The vehicle 502 is traveling past targets 506-1 and 508-1 at a non-uniform speed. The SAR system 504 transmits signals 510 and receives the reflected signals 512 via the main lobe 514 and the grating lobes 516. The initial SAR image 500-1 is produced as described above, and the targets 506-1 and 508-1 are represented by the region of the initial SAR image 500-1 within the circle 518-1. Due to the grating lobes 516, the targets 506-1 and 508-1 are aliased, and the falsely detected targets 506-2, 508-2, 506-3, and 508-3, likewise, are included in the initial SAR image 500-1. Targets 506-2 and 508-2 are present in the region within the circle 518-2, and, similarly, 506-3 and 508-3 are present in the region within the circle 518-3.

The refined SAR image 500-2 is produced by applying the de-aliasing filter is applied to the initial SAR image 500-1 as described herein. The de-aliasing filter reduces the aliasing effects in the refined SAR image 500-2 that were present due to the grating lobes 516. As illustrated in FIG. 5-2, the aliases represented by the regions in the circles 518-2 and 518-3 of the initial SAR image 500-1 in FIG. 5-1 are reduced or eliminated in the refined SAR image 500-2. The refined SAR image 500-2 is a more accurate representation of the environment of the vehicle 502 than the initial SAR image 500-1, and the other vehicle-based systems of the vehicle 502 can make better decisions using the data from the refined SAR image 500-2.

Example Methods

Figure 6:
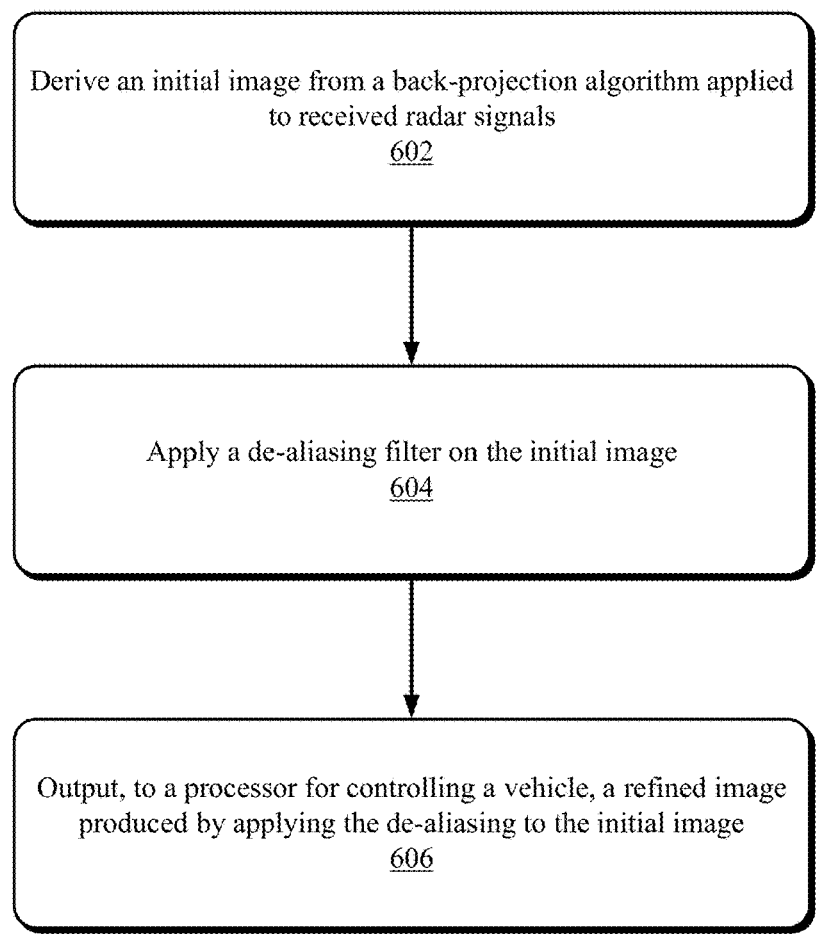
FIG. 6 illustrates an example method of de-aliased imaging for a synthetic aperture radar, in accordance with techniques of this disclosure.

FIG. 6 illustrates an example method 600 of de-aliased imaging for a synthetic aperture radar, in accordance with techniques of this disclosure. The operations (or steps) 602 through 606 are performed but are not necessarily limited to the order or combinations in which the operations are shown herein. Further, any of one or more of the operations may be repeated, combined, or reorganized to provide other operations.

At step 602, an initial image is derived from a back-projection algorithm applied to received radar signals. The radar signals are received using SAR techniques and sampled. The back-projection algorithm produces an initial SAR image. Due to the nature of existing SAR techniques, grating lobes may produce aliasing effects in the initial SAR image that translate into false detections.

At step 604, a de-aliasing filter is applied to the initial SAR image. The de-aliasing filter reduces or removes the grating lobes and the aliasing effects. The de-aliasing filter uses steering vectors related to each pixel in each image produced by each receive channel of the SAR system. This results in reducing or eliminating the grating lobes and the aliasing effects they produce.

At step 606, a refined image produced by applying the de-aliasing filter to the initial image is output to a processor for controlling a vehicle. The processor may control the vehicle by executing instructions related to various vehicle-based systems that rely on the data inferred from the refined image. In other examples, the initial image with the de-aliasing filter applied is output for other purposes by other systems of the vehicle, such as collision warning, blind spot monitoring, user interfaces, or other vehicle functions. Because the refined image more accurately represents the environment of the vehicle than the initial image, the vehicle-based systems can provide greater detail, and enable safer and more efficient driving decisions based on the radar data derived from the refined image.

ADDITIONAL EXAMPLES

Example 1: A method of de-aliased imaging for a synthetic aperture radar, the method comprising: deriving an initial image from a back-projection algorithm applied to signals received by a radar system; applying a de-aliasing filter on the initial image derived from the back-projection algorithm to reduce aliasing effects of grating lobes present in the initial image derived from the back-projection algorithm; and outputting, to a processor for controlling a vehicle, a refined image produced by the de-aliasing filter applied to the initial image derived from the back-projection algorithm.

Example 2: The method of example 1, wherein deriving the initial image from the back-projection algorithm comprises: identifying, based on multiple frames of the signals, range-Doppler detections proximate to the vehicle for each receive channel of a plurality of receive channels of the radar system; and applying the back-projection algorithm to the range-Doppler detections identified for each of the receive channels to determine a set of pixels for each of the receive channels, each pixel in the set of pixels for each of the receive channels indicative of the range-Doppler detections identified at a position corresponding to that pixel.

Example 3: The method of example 2, wherein applying the de-aliasing filter on the initial image comprises: applying, for each of the receive channels, the de-aliasing filter across each pixel in the set of pixels to reduce aliasing effects of the grating lobes present within that receive channel to produce a set of filtered pixels for that receive channel; and using the set of filtered pixels for each of the receive channels to produce the refined image.

Example 4: The method of example 3, wherein using the set of filtered pixels for each of the receive channels to produce the refined image comprises omitting false detections due to the aliasing effects of the grating lobes present within the initial image.

Example 5: The method of example 3, wherein applying, for each of the receive channels, the de-aliasing filter across each pixel in the set of pixels comprises: determining an array steering vector for each pixel in the set of pixels; and filtering, based on the array steering vector for each pixel in the set of pixels, the initial image to produce the refined image.

Example 6: The method of example 5, wherein determining an array steering vector for each pixel in the set of pixels comprises: determining a horizontal distance between each of the receive channels and a radar center; and determining an azimuth of each pixel in the set of pixels associated with each of the receive channels.

Example 7: The method of example 6, further comprising: combining a conjugate of the array steering vector and the respective pixel in the set of pixels associated with each of the receive channels to produce the set of filtered pixels associated each of the receive channels.

Example 8: The method of example 7, further comprising: combining the set of filtered pixels associated with each of the receive channels to produce the refined image.

Example 9: The method of any of the preceding examples, wherein reducing the aliasing effects of the grating lobes comprises: eliminating, based on applying of the de-aliasing filter, the aliasing effects of the grating lobes.

Example 10: The method of any of the preceding examples, further comprising: responsive to reducing the aliasing effects of the grating lobes, representing, at a single position in the refined image, a target that appeared at multiple positions in the initial image.

Example 11: The method of any of the preceding examples, wherein the vehicle travels at a non-uniform speed.

Example 12: The method of any of the preceding examples, wherein the signals are under-sampled.

Example 13: A radar system comprising: at least one processor configured to: derive an initial image from a back-projection algorithm applied to signals received by a radar system; apply a de-aliasing filter on the initial image derived from the back-projection algorithm to reduce aliasing effects of grating lobes present in the initial image derived from the back-projection algorithm; and output, to a processor for controlling a vehicle, a refined image produced by the de-aliasing filter applied to the initial image derived from the back-projection algorithm.

Example 14: The radar system of example 13, wherein the at least one processor is further configured to derive the initial image by at least: identifying, based on multiple frames of the signals, range-Doppler detections proximate to the vehicle for each receive channel of a plurality of receive channels of the radar system; and applying the back-projection algorithm to the range Doppler detections identified for each of the receive channels to determine a set of pixels for each of the receive channels, each pixel in the set of pixels for each of the receive channels indicative of a position and the range-Doppler detections identified at a position corresponding to that pixel.

Example 15: The radar system of example 14, wherein the at least one processor is further configured to apply the de-aliasing filter on the initial image by at least: applying, for each of the receive channels, the de-aliasing filter across each pixel in set of pixels to reduce aliasing effects of grating lobes present within that receive channel to produce a set of filtered pixels for that receive; and using the set of filtered pixels for each of the receive channels to produce the refined image.

Example 16: The radar system of example 15, wherein the at least one processor is further configured to apply the de-aliasing filter by at least: determining an array steering vector for each pixel in the set of pixels for each of the receive channels; combining a conjugate of the array steering vector and the respective pixel in the set of pixels for each of the receive channels; and combining the sets of filtered pixels associated with each of the receive channels to produce the refined image.

Example 17: A computer-readable storage medium comprising instructions that, when executed, configure at least one processor to: derive an initial image from a back-projection algorithm applied to signals received by a radar system; apply a de-aliasing filter on the initial image derived from the back-projection algorithm to reduce aliasing effects of grating lobes present in the initial image derived from the back-projection algorithm; and output, to a processor for controlling a vehicle, a refined image produced by the de-aliasing filter applied to the initial image derived from the back-projection algorithm.

Example 18: The computer-readable storage medium of example 17, wherein the instructions, when executed, configure the at least one processor to apply the de-aliasing filter by at least: identifying, based on multiple frames of the signals, range-Doppler detections proximate to the vehicle for each receive channel of a plurality of receive channels of the radar system; and applying the back-projection algorithm to the range Doppler detections identified for each of the receive channels to determine a set of pixels for each of the receive channels, each pixel in the set of pixels for each of the receive channels indicative of a position and the range-Doppler detections identified at a position corresponding to that pixel.

Example 19: The computer-readable storage medium of example 18, wherein the instructions, when executed, configure the at least one processor to apply the de-aliasing filter by at least: applying, for each of the receive channels, the de-aliasing filter across each pixel in set of pixels to reduce aliasing effects of grating lobes present within that receive channel to produce a set of filtered pixels for that receive; and using the set of filtered pixels for each of the receive channels to produce the refined image.

Example 20: The computer-readable storage medium of example 19, wherein the instructions, when executed, further configure the at least one processor to apply the de-aliasing filter by at least: determining an array steering vector for each pixel in the set of pixels for each of the receive channels; combining a conjugate of the array steering vector and the respective pixel in the set of pixels for each of the receive channels; and combining the sets of filtered pixels associated with each of the receive channels to produce the refined image.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with using SAR techniques can occur in other systems. These problems can include aliasing due to grating lobes created by non-uniform motion of the radar system. Therefore, although described as a way to improve imaging of a SAR in an automotive system, the techniques of the foregoing description can be applied to other systems that include a SAR.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method of de-aliased imaging for a synthetic aperture radar, the method comprising:
   identifying, based on multiple frames of signals received by a plurality of receive channels of a radar system, range-Doppler detections corresponding to each receive channel of the plurality of receive channels;
   applying a back-projection algorithm to the range-Doppler detections identified for each of the receive channels to determine a set of pixels for each respective receive channel, each pixel in each of the sets of pixels indicative of the range-Doppler detections identified at a position corresponding to that pixel;
   deriving, from each set of pixels, initial images related to each receive channel;
   applying a de-aliasing filter to the initial images derived from the back-projection algorithm to produce a refined image; and
   outputting, to a system for controlling a vehicle, the refined image produced by the de-aliasing filter applied to the initial images derived from the back-projection algorithm.

2. The method of claim 1, wherein applying the de-aliasing filter to the initial images comprises:
   applying, for each of the receive channels, the de-aliasing filter across each pixel in each set of pixels related to each receive channel to produce a set of filtered pixels; and
   using the set of filtered pixels to produce the refined image.

3. The method of claim 2, wherein using the set of filtered pixels to produce the refined image comprises omitting false detections due to aliasing effects of grating lobes present within the initial images.

4. The method of claim 2, wherein applying, for each of the receive channels, the de-aliasing filter across each pixel in each set of pixels comprises:
   determining an array steering vector for each pixel in each set of pixels; and
   filtering, based on the array steering vector for each pixel in each set of pixels, the initial images to produce the refined image.

5. The method of claim 4, wherein determining the array steering vector for each pixel in each set of pixels comprises:

determining a horizontal distance between each of the receive channels and a radar center; and determining an azimuth of each pixel in each set of pixels associated with each of the receive channels.

6. The method of claim 5, further comprising:

combining a conjugate of the array steering vector and the respective pixel in each set of pixels associated with each of the receive channels to produce the set of filtered pixels.

7. The method of claim 6, further comprising:

combining the set of filtered pixels associated with each of the receive channels to produce the refined image.

8. The method of claim 1, further comprising:

eliminating, based on applying of the de-aliasing filter, the aliasing effects of the grating lobes.

9. The method of claim 1, further comprising:

responsive to reducing the aliasing effects of the grating lobes, representing, at a single position in the refined image, a target that appeared at multiple positions in the initial image.

10. The method of claim 1, wherein the vehicle travels at a non-uniform speed.

11. The method of claim 1, wherein the signals are under-sampled.

12. A radar system comprising:

at least one processor configured to:

identify, based on multiple frames of signals received by a plurality of receive channels of a radar system, range-Doppler detections corresponding to each receive channel of the plurality of receive channels;

apply a back-projection algorithm to the range-Doppler detections identified for each of the receive channels to determine a set of pixels for each respective receive channel, each pixel in each of the sets of pixels indicative of the range-Doppler detections identified at a position corresponding to that pixel;

derive, from each set of pixels, initial images related to each receive channel;

apply a de-aliasing filter to the initial images derived from the back-projection algorithm to produce a refined image; and output, to a system for controlling a vehicle, the refined image produced by the de-aliasing filter applied to the initial images derived from the back-projection algorithm.

13. The radar system of claim 12, wherein the at least one processor is further configured to apply the de-aliasing filter to the initial images by at least:

applying, for each of the receive channels, the de-aliasing filter across each pixel in each set of pixels related to each receive channel to produce a set of filtered pixels; and using the set of filtered pixels to produce the refined image.

14. The radar system of claim 13, wherein the at least one processor is further configured to apply the de-aliasing filter by at least:

determining an array steering vector for each pixel in each set of pixels for each of the receive channels;

combining a conjugate of the array steering vector and the respective pixel in each set of pixels associated with each of the receive channels; and combining the sets of filtered pixels associated with each of the receive channels to produce the refined image.

15. A computer-readable storage medium comprising instructions that, when executed, configure at least one processor to:

identify, based on multiple frames of signals received by a plurality of receive channels of a radar system, range-Doppler detections corresponding to each receive channel of the plurality of receive channels;

apply a back-projection algorithm to the range-Doppler detections identified for each of the receive channels to determine a set of pixels for each respective receive channel, each pixel in each of the sets of pixels indicative of the range-Doppler detections identified at a position corresponding to that pixel;

derive, from each set of pixels, initial images related to each receive channel;

apply a de-aliasing filter to the initial images derived from the back-projection algorithm to produce a refined image; and output, to a system for controlling a vehicle, the refined image produced by the de-aliasing filter applied to the initial images derived from the back-projection algorithm.

16. The computer-readable storage medium of claim 15, wherein the instructions, when executed, configure the at least one processor to apply the de-aliasing filter by at least:

applying, for each of the receive channels, the de-aliasing filter across each pixel in each set of pixels related to each receive channel to produce a set of filtered pixels; and using the set of filtered pixels for each of the receive channels to produce the refined image.

17. The computer-readable storage medium of claim 16, wherein the instructions, when executed, further configure the at least one processor to apply the de-aliasing filter by at least:

determining an array steering vector for each pixel in each set of pixels for each of the receive channels;

combining a conjugate of the array steering vector and the respective pixel in each set of pixels associated with each of the receive channels; and combining the sets of filtered pixels associated with each of the receive channels to produce the refined image.

* * * * *